E. SCHNEIDER.
APPARATUS FOR ASSEMBLING PISTON RODS AND THE LIKE.
APPLICATION FILED JULY 21, 1920.
1,406,229.
Patented Feb. 14, 1922.
2 SHEETS—SHEET 1.
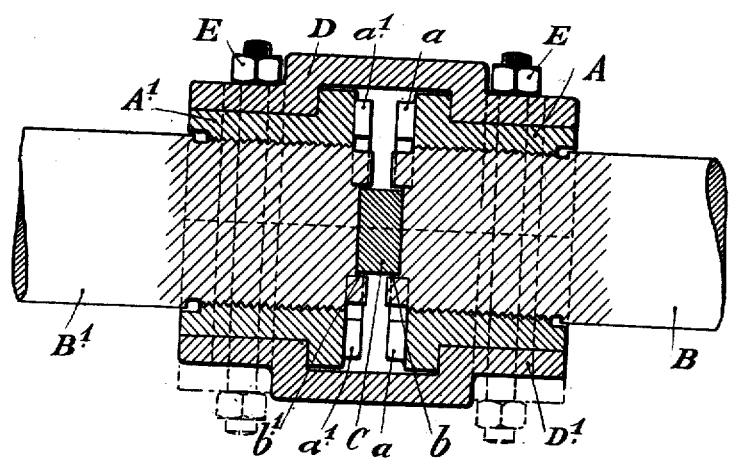
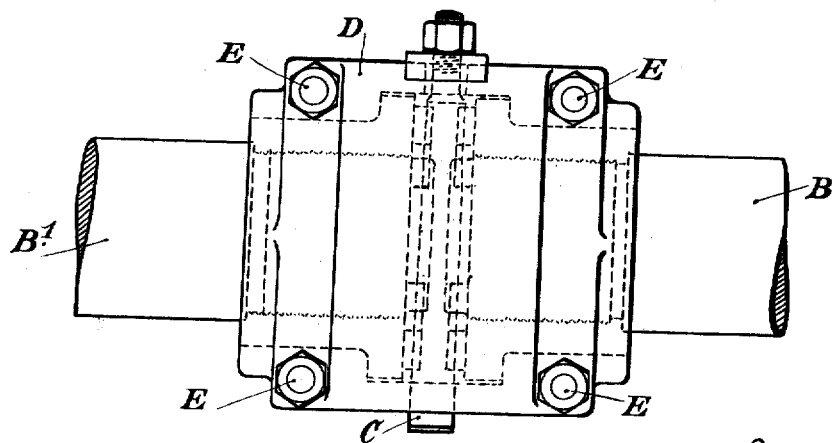

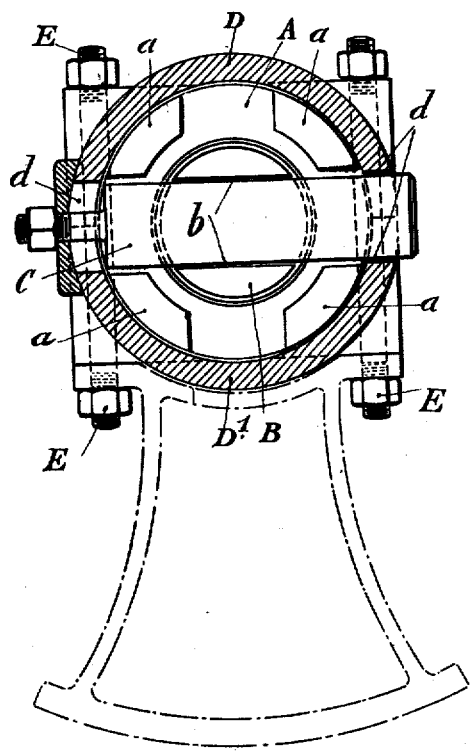

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

APPARATUS FOR ASSEMBLING PISTON RODS AND THE LIKE.

1,406,229.      Specification of Letters Patent.      Patented Feb. 14, 1922.

Application filed July 21, 1920. Serial No. 397,955.

*To all whom it may concern:*

Be it known that I, EUGÈNE SCHNEIDER, a citizen of the Republic of France, resident of Paris, France, have invented new and useful Improvements in Apparatus for Assembling Piston Rods and the like, which invention is fully set forth in the following specification.

The various devices employed hitherto for assembling the piston rods of reciprocating engines generally comprise either a nut in two parts assembled along a diametral plane by means of bolts and engaging the screwthreaded portion of each rod, or a nut having two opposite screwthreads adapted to screw on the screwthreaded ends of the rods. A suitable wedging device acting upon the ends of the rods and extending through the nuts prevents the latter from becoming loose and insures their engagement with the screwthreads.

Those devices have serious disadvantages.

In the first mentioned case the screwthreads of each half of the nut do not provide a suitable bearing upon the screwthreads of the rods which results in frequent stripping of the screwthreads by the effect of the forces, which are transmitted alternately by the rods.

In the second case, the engagement of the nut in the screwthreads of the rods is an extremely delicate and laborious operation, especially in the case of rods of large diameter, requiring very heavy nuts which are consequently not convenient to handle, as is the case for instance with high-powered gas engines of the double-acting tandem type.

In both cases the adjustment of the ends of the rods, and consequently the position of the pistons in the cylinders, cannot be effected to within one screwthread, which is a much too large amount, especially in the case of large screwthreads.

The improved apparatus forming the subject matter of the present invention overcomes the aforestated disadvantages; it is illustrated in the accompanying drawings in which:—

Fig. 1 is a longitudinal section;
Fig. 2 a cross section, and
Fig. 3 a plan thereof.

It comprises essentially two similar nuts A and A¹ of the same pitch, adapted to screw on the ends of the rods B and B¹. These nuts are formed with nibs $a$ and $a^1$ of any even number, preferably four, as shown in Fig. 2.

Similar grooves $b$, $b^1$, slightly inclined in the direction of their depth and having a width that is slightly less than the gap between the nibs $a$ $a^1$ of the nuts, are formed in the ends of the rods B, B¹.

In these grooves there engages a wedge-key C having the same taper in the direction of its thickness as have the grooves $b$ $b^1$ in the direction of their depth.

The whole is held rigidly in place by an assembling sleeve composed of two parts D, D¹ that are firmly fastened together by bolts E and are pierced with apertures $d$ for the passage of the wedge C, and are of dimensions adapted to take the alternating strains transmitted through the rods. The sleeve D D¹ serves as an abutment for the nuts A and A¹ which are pressed firmly by the conical wedge C on the one hand against the sleeve, and on the other hand against the screwthreads of the rods.

With an apparatus of this kind the adjustment of the rods is an extremely easy operation, and can be assured to within a fraction of a screwthread (¼ in the example shown) by rotating one or the other of the nuts.

This apparatus is moreover very easy to erect.

The nuts which are very readily handled, having been screwed on their rods in a position previously marked, it is sufficient to bring the ends of the rods towards each other to be able to engage freely the sleeve composed of two parts D, D¹.

The insertion of the wedge C¹ forces the rods apart, and thus causes the nuts to bear against the sleeve, thereby insuring the locking of the whole.

In cases where it is necessary to have a slide shoe for the purpose of support, it will be advisable to fix this shoe to the sleeve, utilizing for this purpose the two bolts that connect together the two parts of the said sleeve, as indicated in dot-and-dash lines in Fig. 2.

Having now particularly described and ascertained the nature of my said invention and in what manner the same is to be performed, I declare that what I claim is:—

1. In an apparatus for assembling piston rods, the combination of a pair of opposed rods arranged in alignment, grooves in the adjacent ends of said rods, a pair of members having threaded engagement with said rods at adjacent ends thereof, the opposed faces of each member being formed with a plurality of spaced projections, means coacting with and forming an abutment for said members, and locking means for said rods engaging in said grooves and aligned spaces between said projections.

2. In an apparatus for assembling piston rods transmitting alternating strains, the combination of a pair of opposed rods arranged in alignment, grooves in opposed ends of said rods, a pair of members having threaded engagement with said rods at the opposed ends thereof, the adjacent faces of each member being formed with a plurality of spaced projections, a two-part sleeve surrounding and forming an abutment for said member, one part of said sleeve carrying a slide block adapted to form a support for the rods, and locking means for said rods engaging in said grooves and aligned spaces between said projections.

3. In an apparatus for assembling piston rods, the combination of a pair of opposed rods arranged in alignment, inclined grooves in the opposed ends of said rods, a pair of nuts having threaded engagement with said rods at the adjacent ends thereof, the opposed faces of said nuts each being provided with a plurality of spaced projections, the spaces between said projections being of greater width than the grooves in said rods, means surrounding and forming an abutment for said nuts, and a wedge-shaped key engaging in said inclined grooves and aligned spaces between said projections whereby relative rotation between said rods is prevented.

4. In an apparatus for assembling piston rods transmitting alternating strains, the combination of a pair of opposed screw threaded rods arranged in alignment and each having an end groove, a pair of members engaging said threaded rods and each provided with angularly arranged nibs, the spaces between said nibs being adapted to register with the end grooves in said rods, means surrounding and forming an abutment for said members, and means for locking said rods and members in different angular positions, said means being adapted to engage said grooves and aligned spaces between said projections, whereby adjustment of said rods may be effected to a fraction of the pitch of their respective screw threads.

Dated this 27th day of May, 1920.

In testimony whereof I have signed this specification.

EUGÈNE SCHNEIDER.

Witnesses:
 ANDRÉ MOSTICKER,
 CLEMENT S. EDWARDS.